United States Patent [19]
Arnold et al.

[11] Patent Number: 5,343,618
[45] Date of Patent: Sep. 6, 1994

[54] METHOD OF ASSEMBLING A SHAFT AND APERTURED MEMBER

[75] Inventors: Philip D. Arnold, Mt. Clemens; Roy G. Kaywood, Stockbridge, both of Mich.

[73] Assignee: General Motors Corporation, Detroit, Mich.

[21] Appl. No.: 942,051

[22] Filed: Sep. 8, 1992

Related U.S. Application Data

[63] Continuation of Ser. No. 753,554, Sep. 3, 1991, abandoned.

[51] Int. Cl.$^5$ ............................................. B23P 15/00
[52] U.S. Cl. ................................ 29/888.08; 29/888.1; 74/567
[58] Field of Search ............... 29/888.1, 888.08, 523; 74/567, 568

[56] References Cited

U.S. PATENT DOCUMENTS

| | | | |
|---|---|---|---|
| 2,364,109 | 12/1944 | Taylor | 29/6 |
| 2,730,912 | 1/1956 | Marinelli | 74/597 |
| 3,296,886 | 1/1967 | Reinhart, Jr. | 74/572 |
| 3,309,941 | 3/1967 | Kappel | 74/597 |
| 3,999,277 | 12/1976 | Hamada | 74/567 |
| 4,046,028 | 9/1977 | Vachris | 74/603 |
| 4,342,236 | 8/1982 | Everts | 74/603 |
| 4,554,893 | 11/1985 | Vecellio | 123/41.83 |
| 4,597,365 | 7/1986 | Madaffer | 29/888.1 |
| 4,622,864 | 11/1986 | Fetouh | 74/597 |
| 4,708,029 | 11/1987 | Llrano | 74/567 |
| 4,763,503 | 8/1988 | Hughes et al. | 29/888.1 |
| 4,809,562 | 3/1989 | Bendoraitas et al. | 74/567 |
| 4,835,832 | 6/1989 | Arnold et al. | 29/523 |
| 4,838,116 | 6/1989 | Saito et al. | 74/595 |
| 4,841,627 | 6/1989 | Arnold et al. | 29/720 |
| 4,875,270 | 10/1989 | Krips et al. | 29/888.1 |
| 4,922,785 | 5/1990 | Arnold et al. | 74/567 |
| 4,993,282 | 2/1991 | Swars | 74/567 |
| 5,067,369 | 11/1991 | Taniguchi | 74/567 |
| 5,081,884 | 1/1992 | Cheng et al. | 74/595 |
| 5,085,099 | 2/1992 | Hughes | 74/567 |
| 5,088,345 | 2/1992 | Kemmler et al. | 74/598 |

FOREIGN PATENT DOCUMENTS

| | | |
|---|---|---|
| 3803683C2 | of 0000 | Fed. Rep. of Germany . |
| 1270893 | 6/1968 | Fed. Rep. of Germany . |
| 3809369 | 9/1989 | Fed. Rep. of Germany . |
| 60-37411 | 2/1985 | Japan . |
| 1423831A1 | of 0000 | U.S.S.R. . |
| 724025 | 2/1955 | United Kingdom . |

Primary Examiner—Irene Cuda
Attorney, Agent, or Firm—C. K. Veenstra

[57] ABSTRACT

A tubular shaft has a portion of reduced inner diameter at a location where joining to an apertured member is desired. The aperture in the member is lobed with splines in the lobes and has an undercut groove or grooves, and is hardened. The shaft is inserted in the aperture and the reduced inner diameter portion is expanded to force the shaft material into the lobes and groove and around the splines to form a connection which resists torque and axial separation. The tube expansion is effected by forcing a series of balls through the reduced diameter portion, each ball being slightly larger than the reduced diameter and larger than the previous ball but smaller than the remainder of the shaft I.D. A crankshaft is assembled with this method wherein counterweights have lobed apertures to receive end portions of crank pins and main journals having reduced I.D.'s.

18 Claims, 3 Drawing Sheets

METHOD OF ASSEMBLING A SHAFT AND APERTURED MEMBER

CROSS-REFERENCE TO RELATED APPLICATIONS

This is a file-wrapper-continuation of application Ser. No. 07/753,554 filed Sep. 3, 1991 and now abandoned.

Subject matter disclosed in this application is also claimed in our copending application 07/902,439 filed Jun. 18, 1992 which is a file-wrapper-continuation of application 07/753,553 filed Sep. 3, 1991.

TECHNICAL FIELD

This invention relates to the assembly of mechanical parts such as crankshaft elements and particularly to a method of joining a hollow shaft to a member receiving ends of the shaft.

BACKGROUND

It is known in the art relating to crankshafts for internal combustion engines to make one-piece castings or forgings which entails considerable machining to remove large quantities of excess metal to define crank pins, main journals, and crank arms or counterweights. When the crankshaft is intended for use in a two stroke engine, seal plates must also be provided which requires substantially more machining if the entire crankshaft is to remain as one piece, or otherwise the seal plates must somehow be separately assembled. The term counterweight(s) as used herein is intended to broadly include crank arms with or without additional counterweighting portions and with or without integral seal plate portions.

It is also known that by assembling the crankshaft of many separate elements much of the machining can be eliminated and the remaining machining is performed on small simple elements such as pins, counterweights and seal plates. The elements are then joined by bolting together or by press fit, for example, to assemble the entire crankshaft. The best way of joining the elements depends on the particular application or load requirements of the assembly. One type of joint, such as main journal to counterweight connection, may be assembled by one method while the crank pins, for example, could be joined to counterweights by another method.

A simple and effective method of joining parts on a common shaft is shown in U.S. Pat. No. 4,835,832 to Arnold et al, entitled "Method of Assembling Tubular Shaft Assemblies", which is incorporated herein by reference. This method, sometimes known as "ballizing", comprises positioning hollow parts, such as cams of a camshaft, on a tube and expanding the tube to hold the parts by clamping the ends of the tube to prevent longitudinal growth and forcing a ball through the tube which is larger than the original tube inner diameter. The hollow parts have a lobular inner cross section to receive the expanded tube outer diameter and include splines to hold the part against rotation on the tube.

Development work on extending the ballizing method to the joining of crankshaft parts has led to a second generation ballizing method which is improved, at least for some applications, over that disclosed in U.S. Pat. No. 4,835,832. This improved joining method can be used advantageously for joining crank pins and/or main journals to counterweights, but it will be seen that its scope is not limited to crankshafts. Rather, it has a general purpose for coupling a tubular shaft to an apertured member.

SUMMARY OF THE INVENTION

The present invention is an improved method of joining a shaft to another member; it is also an improved method of assembling a crankshaft.

These and other features and advantages of the invention will be more fully understood from the following descriptions of certain specific embodiments of the invention taken with the accompanying drawings.

BRIEF DRAWING DESCRIPTION

Figure 1:
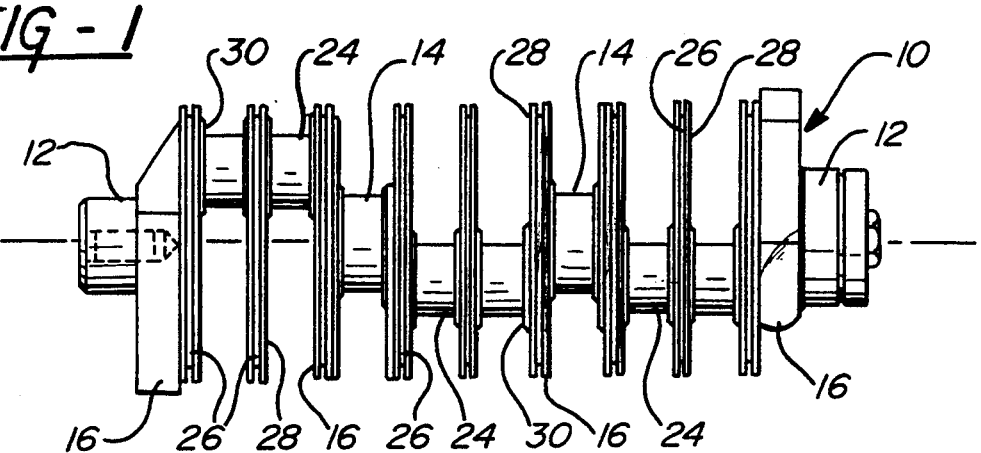
FIG. 1 is a side view of a crankshaft built according to the invention.
Figure 2:
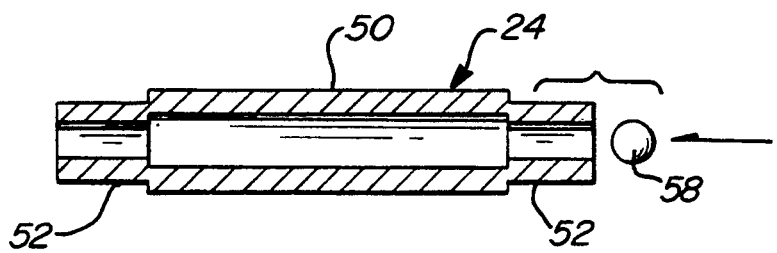
FIG. 2 is a cross-sectional view of a crank pin for the crankshaft of FIG. 1.
Figure 3A:
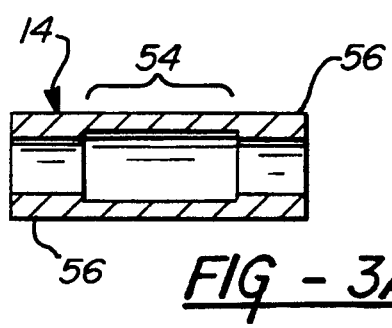
FIGS. 3a and 3b are cross-sectional views of intermediate and end main journals for the crankshaft of FIG. 1.
Figure 3B:
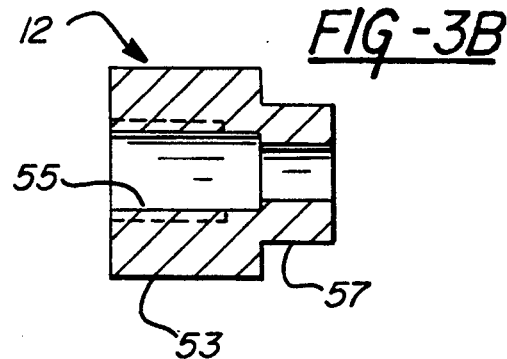
Figure 4:
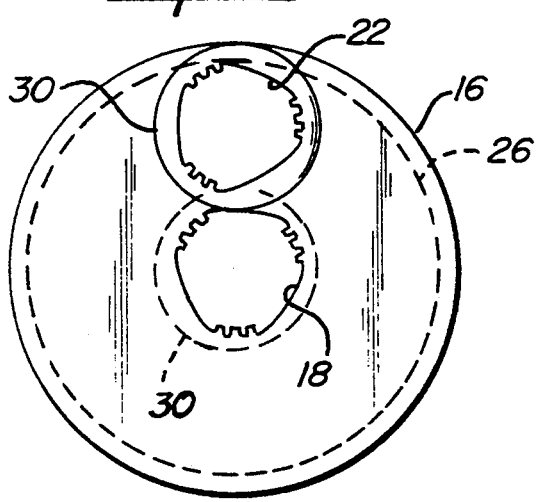
FIG. 4 is an end view of a counterweight for the crankshaft of FIG. 1.
Figure 5:
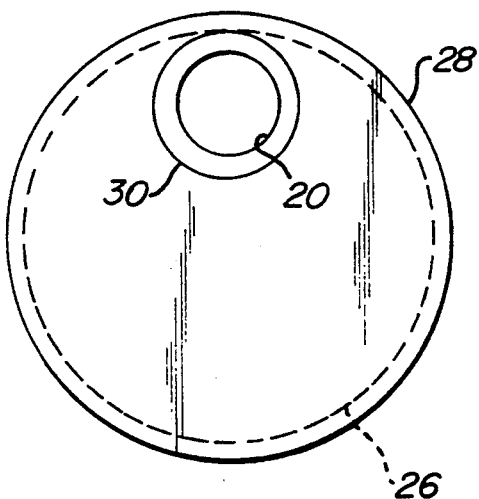
Figure 7:
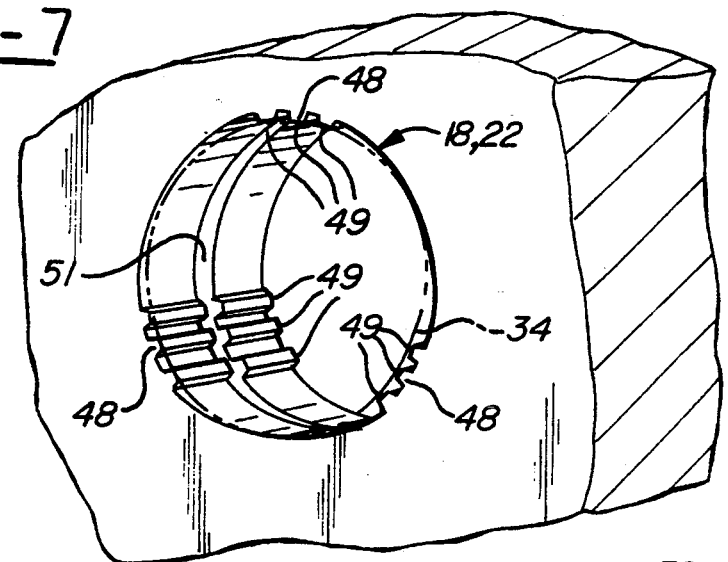
Figure 6:
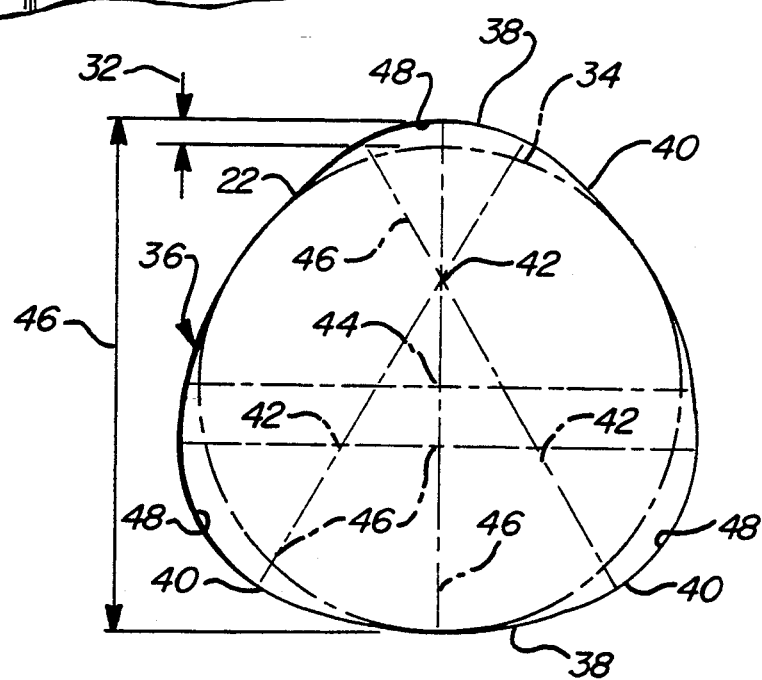
Figure 8A:
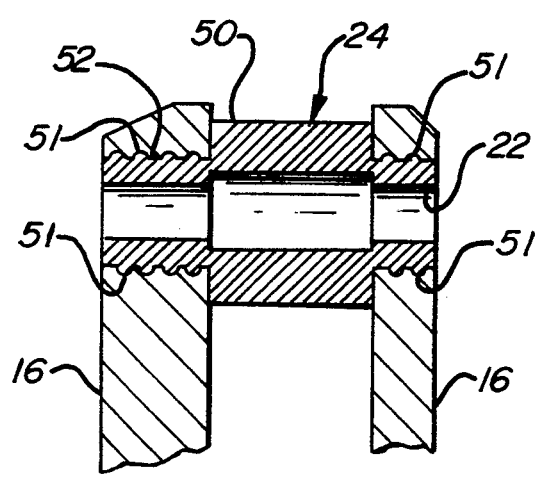
Figure 8B:
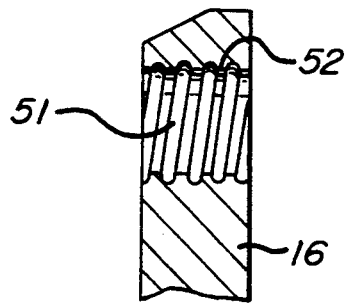
Figure 9:
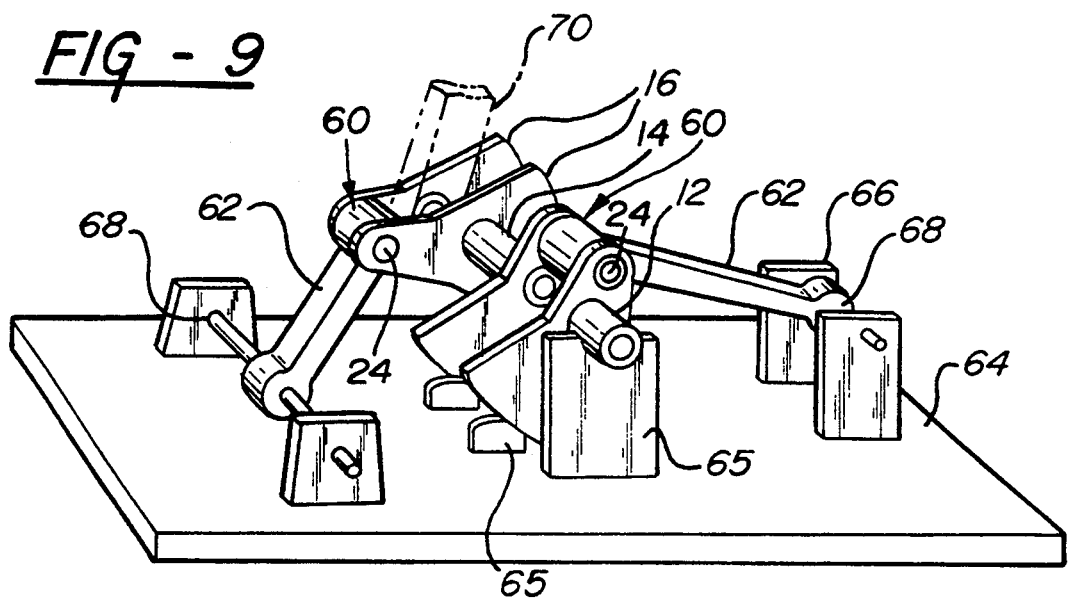
Figure 10:
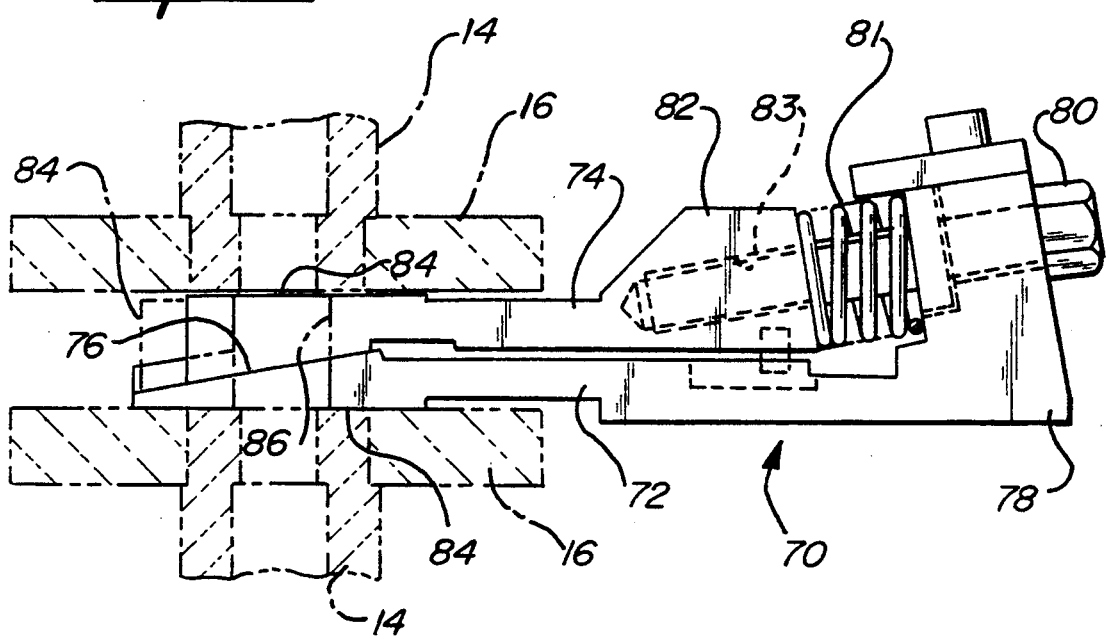

FIG. 5 a side view of a seal plate for the crankshaft of FIG. 1;

FIG. 6 is a graphical presentation of the development of a trilobed configuration as used for the apertures of the counterweight of FIG. 4;

FIG. 7 is an isometric view of a portion of the counterweight of FIG. 4 showing details of a trilobed aperture according to the invention;

FIG. 8a is a cross-sectional view of a crank pin as assembled to counterweights according to the invention;

FIG. 8b is a cross-sectional view of the counterweight of FIG. 8a without a crank pin;

FIG. 9 is an isometric view of a crankshaft assembly fixture and a portion of a crankshaft illustrating an assembly method according to the invention; and FIG. 10 is a side view of an assembly fixture used with the fixture of FIG. 9.

Corresponding reference characters indicate corresponding parts throughout the several views of the drawings.

DETAILED DESCRIPTION

Referring to FIGS. 1–5, a crankshaft 10 for a six cylinder two stroke engine comprises end main journals 12, two intermediate main journals 14, counterweights or crank arms 16 coupled through axial center apertures 18 to one end of each end journal 12 and both ends of intermediate main journals 14 as well as through off-axis apertures 22 to both ends of crank pins 24. Each counterweight 1b is circular and has a circumferential groove 26 for receiving a seal, not shown. Additionally, a circular seal plate 28 is attached to each of the crank pins 24 midway between its supporting counterweights 16 and has a circumferential groove 26, also for receiving a seal. The seal plates 28 have circular off-axis apertures 20 for attachment to the crank pins 24 by a shrink fit. The various seals cooperate with circular opening of webs in the engine crankcase to separate the crankcase into compartments for managing the flow of intake air and exhaust.

For small two stroke engines which do not require a compartmentalized crankcase or for four stroke engines, the seal plates 28 and the grooved circular counterweights 16 are not necessary and conventionally shaped counterweights may be used instead. In either case, roller bearings and connecting rods are assembled to the crank pins 24 prior to assembly with the counterweights so that a one piece connecting rod and a non-split roller bearing cage can be used. Likewise, roller bearings are assembled to the main bearings 14 prior to assembly. The surface of the crank pins 24 and the main journals 14,16 are hardened to 60-62 Rockwell C to serve as inner races of the roller bearings. Hardened thrust faces 30 on the counterweights and seal discs prevent the roller bearings from moving axially, and also guide the connecting rods. In two stroke engines the lubrication to the bearings is provided by a fine mist of oil carried into the crankcase by the air supply. In four stroke engines oil passages formed in the crankshaft between the main journals and the crank pins are coupled with an oil galley in the cylinder block for lubricating the crank pin bearings.

The main journals 12,14 and crank pins 24 are joined to apertures 18,22 in the counterweights by an improved form of an expansion technique known as "ballizing" which is explained in its fundamental form in the above-mentioned U.S. Pat. No. 4,835,832 and which entails forming an aperture in each of a number of outer elements (such as cams) which aperture is lobular in cross section and has an uneven number of lobes, preferably three or five; inserting a tube through the apertures of the outer elements; holding the ends of the tube against axial elongation; and mechanically expanding the tube to fill the cross section of the apertures, thereby securing the outer elements to the tube. Preferably the mechanical expansion is performed by forcing a hardened ball through the tube, the ball being a few thousandths inch larger in diameter than the tube inner diameter. Reference may be had to the U.S. Pat. No. 4,835,832 for further details.

In FIG. 6 a graphical illustration taken from U.S. Pat. No. 4,835,832, of the development of a trilobed figure is presented having an eccentricity 32 measured from a circle defining the minimum radius of the trilobed perimeter 36. The developed perimeter 36 is made up of blended tangent swing radii in the form of a series of alternating long arcs 38 and short arcs 40 which are drawn from three equally spaced centers 42 spaced about the true center 44 of the figure. The result is that the perimeter has an over all uniform height or width 46 in any direction. For simplicity, this is generally referred to as a uniform diameter 46 although it should be understood that this uniform diameter dimension passes sequentially through each of three centers 42 and only passes through the true center 44 when the diameter is at the midpoints of two opposing long and short arcs 38,40. Thus each set of long and short arcs forms a lobe 48. The eccentricity 32 of each lobe is on the order of 0.010 to 0.020 inch. The lobes 48 provide torque capacity to the ballized joint and splines may be added, as discussed below, to further enhance torque capacity.

The improved or second generation ballizing technique utilizes the lobed aperture described in FIG. 6 and adds some other features. First, the tube which extends through openings of all the elements is eliminated and each crank pin 24 or main journal 12,14 has an integral tubular extension which is inserted into the corresponding lobed aperture of the counterweight and expanded to form the joint. Thus the crank pin 24 of FIG. 2 has a surface hardened crank pin body portion 50 and two crank pin end or joining portions 52 of reduced diameter which are not hardened, while the intermediate main journal 14 of FIG. 3a has a hardened main journal body portion 54 and two main journal or joining end portions 56 of the same diameter as the main journal body portion which are not hardened. The end main journal 12 of FIG. 3b has a hardened main journal body portion 53 with an internally threaded bore 55 and one non-hardened main journal end or joining portion 57 of reduced diameter. It is apparent that either the crank pin or the main journal may have a reduced end portion or nonreduced end portion. A second improvement is that the mechanical expansion is selective, affecting only a portion of the tubular element through which the ball is passed. To carry out the selective expansion, the body portion 50 or 54 has a larger inner diameter than the end portions 52 or 56, and the balls 58 which pass through the crank pin or main journal is of intermediate size, being larger than the I.D. of the end portions and smaller than the I.D. of the body portions. A third improvement is that instead of effecting the expansion by a single pass of a ball, three balls of successively larger diameters are used sequentially to expand the end portions in stages, creating greater deformation with less force. A fourth improvement is in making undercuts such as circumferential or helical grooves in the aperture to resist axial movement when the metal of the end portion has been expanded into the undercut.

FIG. 7 shows a typical aperture 18,22 in a counterweight for receiving either a crank pin 24 or a main journal 14,16. The lobes 48 of the aperture are each provided with a few splines 49 extending parallel to the shaft axis. The lobe eccentricity and the spline form provide good torque capacity when assembled with the crank pin or main journal. The spline height may be the same dimension as the eccentricity. A circumferential groove 51 in the aperture has a depth of about 0.015 inch and a width of about 0.030 inch. Several grooves may be preferred to increase the axial strength. As shown in FIG. 8a, which represents the crank pin 24 assembled to counterweights 16 without a seal plate, the crank pin end portion metal fills the groove 51 or grooves upon assembly to secure the joint against axial separation. The off axis aperture is hardened to about 40 Rockwell C, while the crank pin end portion is not hardened to assure that the crank pin end portion metal will expand into conformity with the off-axis aperture 22. As indicated in FIGS. 8a and 8b, the undercut may comprise a helical groove 51 in the inner circumference of the off-axis aperture.

The crank pin 24 may have typical crank pin body portion 50 dimensions of 1.5 inch O.D. and 0.79 inch I.D., and crank pin end portion 52 O.D. of 1.25 inch and I.D. of 0.72 inch so that the crank pin end wall thickness is about 0.26 inch prior to assembly. After the crank pin end portions are inserted into the apertures 22 a first hardened bell 58 having a diameter of about 0.005 inch greater than the crank pin end portion I.D. is forced through the crank pin 24, and then a second and a third ball are successively forced through the crank pin, each ball 58 being about 0.005 inch greater in diameter than the previous ball, so that the crank pin end portions are progressively expanded into tight conformity with the off-axis apertures. The crank pin body portion I.D. is larger than the largest ball so that it serves as a guide passage for the ball as it traverses from one crank pin end portion 52 to another but it offers no resistance to its movement. The intermediate main journal 14 may be larger in diameter so that its end portion 56 wall thickness is about 0.33 inch. The intermediate main journal end portions 56 are expanded after insertion into center apertures 18 by balls of successively greater diameters.

By using more than one ball 58 for expansion, greater deformation can be attained and lower forces are needed to push the ball through the end portions. By this arrangement it is possible to selectively expand a tubular element by the provision of an I.D. smaller than the balls where expansion is desired and a larger I.D. where expansion is not desired. Thus it is not required to expand both ends of a tubular shaft. The end main journals 12 are attached to the outer counterweights 16 by only end main journal end portion 57, and thus only that one end portion has a small I.D. for expansion by a ball. It is evident then, that the small I.D. may be located wherever desired in the tubular shaft and may be intermediate the ends in addition to or instead of at an end.

In assembling a crankshaft 10, there are several options for the order of assembly of the parts. For example, the assembly may start at one end of the crankshaft 10 and parts added in order of their location in the assembly, using a fixture to hold each part in position, and completing the joints by expansion of the end portions as each section, e.g. a crank pin 24 and its associated counterweights 16, is assembled. Alternatively, the parts can be placed in the fixture with end portions inserted into their respective apertures prior to completing the joints. Referring to FIG. 9, it is also possible to assemble subassemblies 60 of a crank pin 24, its connecting rod 62 (with roller bearings, not shown) and associated counterweights 16 with the joints completed and then combine the subassemblies by orienting the subassemblies 60 in a fixture 64 and installing the main journals 12,14. Locating details 65 engage various features of the crankshaft parts to establish correct orientation. The free ends 66 of the connecting rods 62 are held in fixed points by locating rods 68 thereby precisely controlling the relative angle of the crank pins 24. Even if the intermediate main journal 14 end portions are inserted in the center apertures 18 of the counterweights 16 they are not yet fixed and the crank pin 24 angles can be adjusted as required by the fixture 64. Then, when the subassemblies are properly oriented, the end portions of the bearings main journals 12,14 are expanded by ballizing to finally complete the joints.

To ballize the main journals 12,14 while in the fixture 64 shown in FIG. 9, it is desirable to pass each ball 58 through all the main journals in a single pass. Since the main journals 12,14 are separated by axial spaces adjacent the crank pins 24, a fixture 70, shown in dashed lines in one such location, is provided to bridge the space and provide a passageway for the balls. Another function of such a fixture 70 is to transfer axial force from one main journal to another. This allows a clamping force for preventing axial growth of each main journal to be applied at each outboard end of the ends main journal 12 and transmitted to the intermediate main journals 14. FIG. 10 shows the fixture 70 which comprises first and second plates 72 and 74 which are relatively slidable along an axis and which have at one end cooperating ramp or wedge faces 76. At the other end, the plate 72 has a laterally extending head 78 including an aperture for receiving a hex head bolt 80. The other plate 74 has a body 82 with an internally threaded bore 84 for receiving the threaded end of the bolt 80. The bolt 80 is positioned with its axis parallel to the ramp faces and by turning the bolt 80 the plates are caused to slide at the ramp faces and the relative position of the plates 72 and 74 is controlled. A spring 81 around the bolt 80 and between the plate 74 and head 78 urges the plate 74 in the release direction when the bolt is loosened. (The bolt 80 is used in a prototype fixture 70; an air pressure operated linear actuator is preferred for a production fixture.) The outboard faces 84 of the plates 72,74 at the one end are parallel and remain so during the sliding action, and the spacing of the faces 84 changes. At the smallest spacing of the outboard faces 84, as shown in phantom lines, the fixture 70 is inserted into the space between the counterweights 16 in line with the apertures 18. At that position the bolt 80 is turned to increase the spacing of the faces 84 thereby expanding the fixture 70 tightly against the counterweights 16 and the ends of the intermediate main journals 14. Bores 86 in each of the plates 72,74 aligned with the axes of the main journals 12,14, when installed, allow the passage of the balls 58 when they are passed through the main journals. Thus the bores 86 are larger than the balls 58 but are small enough to allow the faces 84 to engage the ends of the main journals 12,14 If such a fixture 70 is installed in each of the spaces between main journal ends, a clamping force applied to the outer ends of the end main journals 12 will be exerted longitudinally through all the main journals 12,14 and the fixtures 70. The clamping force can be applied by mechanical or hydraulic apparatus like that shown in U.S. Pat. No. 4,835,832. It will be apparent that the improved ballizing joining method is of advantage in the fabrication of crankshafts. The improved ballizing joining method is especially well suited for fabricating the assembled crankshaft of U.S. Ser. No. 07/753,553, filed Sep. 3, 1991, titled "Assembled Crankshaft". Some of the joints may be joined by ballizing and other joints may be joined by other methods. For example, the crank pin 24 ends may be ballized to the counterweights 16 and the main journals 12,14 may be press fit in the counterweights, or vice versa. Alternatively, the main journals and counterweights 16 may be cast or forged as a unit and the crank pins 24 formed separately and joined by ballizing.

It will further be apparent that the improved ballizing method is useful for the attachment of any tubular shaft to an apertured member.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. The method of assembling a shaft in an aperture comprising the steps of:
   forming in a first member an aperture with a lobular cross section having an odd number of lobes;
   forming a hollow tubular shaft having a body portion, and an end portion sized to snugly fit within the aperture of the first member, the end portion having an inner diameter smaller than that of the body portion;
   inserting the shaft end portion into the aperture;
   restraining the shaft against elongation by application of longitudinal clamping force to both ends of the shaft; and
   expanding the end portion into tight conformity with the aperture by forcing through the end portion at least one hardened ball having a diameter larger than the end portion inner diameter and smaller than the body portion inner diameter.

2. The invention as defined in claim 1 wherein the step of expanding comprises forcing a plurality of balls through the end portion one at a time, each successive ball being larger in diameter than the previous ball to expand the end portion in stages.

3. The invention as defined in claim 1 including the step of forming a circumferential groove in the aperture such that the end portion expanded into the aperture and into the groove will be held against axial movement in the aperture.

4. The invention as defined in claim 1 including the step of forming a spline in the aperture such that the end portion expanded into the aperture in conformation to the splines will be held against rotation in the aperture.

5. The method of joining a plurality of axially spaced members with at least one tubular element comprising the steps of:
forming in each member an aperture with a lobular cross section having an odd number of lobes;
forming at least one hollow tubular element having at least one body portion, and joining portions sized to snugly fit within the respective apertures of the members, the joining portions each having an inner diameter smaller than that of the body portions;
aligning the members with their respective apertures on a common axis;
inserting the joining portions into the apertures;
restraining each tubular element against elongation by application of longitudinal clamping force to both ends of the element;
forcing through each joining portion at least one hardened ball having a diameter larger than the joining portion inner diameter and smaller than the body portion inner diameter and passing the ball from one joining portion to another for successively expanding the joining portions into tight conformity with the respective apertures.

6. The invention as defined in claim 5 wherein the joining portions are on the same tubular element and the ball passes through the tubular element from one joining portion to another.

7. The invention as defined in claim 5 wherein the joining portions are on separate axially spaced tubular elements and the space is bridged by a fixture having a passage slightly larger than the ball, and wherein:
the step of restraining each tubular element against elongation includes tightly inserting the fixture between opposed ends of spaced tubular elements for transmitting clamping force from one element to another; and
the step of passing the ball from one joining portion to another includes passing the ball through the passage of the fixture.

8. The method of assembling a crankshaft from separate hollow tubular crank pins, main journals and counterweights, each counterweight having a center aperture on the axis of rotation for receiving a main journal and an off-axis aperture for receiving a crank pin; including the steps of:
forming in each counterweight an off-axis aperture with a lobular cross section having an odd number of lobes;
forming on each crank pin a crank pin body portion, and end portions sized to snugly fit within the off-axis apertures of the counterweight, the crank pin end portions having an inner diameter smaller than that of the crank pin body portions;
inserting the crank pin end portions into the off-axis apertures;
restraining the crank pins against elongation by application of longitudinal clamping force to both ends of each such crank pin;
expanding the crank pin end portions into tight conformity with the off-axis apertures by forcing through the crank pin end portions at least one hardened ball having a diameter larger than the crank pin end portion inner diameter and smaller than the crank pin body portion inner diameter, whereby the crank pin end portions are selectively expanded; and
assembling the main journals with the center apertures of the counterweights.

9. The invention as defined in claim 8 wherein the crankshaft includes connecting rods attached to the crank pins and including the steps of:
first assembling subassemblies of connecting rods, crank pins and counterweights;
then orienting a plurality of subassemblies with crank pins at the correct angles; and
then assembling the main journals to the counterweights.

10. The invention as defined in claim 9 including the steps of:
forming in each counterweight a center aperture with a lobular cross section having an odd number of lobes;
forming on the main journals a main journal body portion, and end portions sized to snugly fit within the center apertures of the counterweight, the main journal end portions having an inner diameter smaller than that of the main journals body portion; and
wherein the step of assembling the main journals to the counterweights comprises:
inserting the main journal end portions into the center apertures;
restraining the main journals against elongation by application of longitudinal clamping force to both ends of each such main journal; and
expanding the main journal end portions into tight conformity with the center apertures by forcing through the main journals at least one hardened ball having a diameter larger than the main journal end portion inner diameter and smaller than the main journal body portion inner diameter, whereby the end portions are selectively expanded.

11. The invention as defined in claim 9 wherein the orienting step comprises:
positioning each subassembly with the center apertures on a predetermined axis; and
positioning the free end of each connecting rod at a predetermined location corresponding to the correct angle for each subassembly, whereby the angle of the crank pin is established.

12. The method of assembling a shaft in an aperture comprising the steps of:
forming in a first member an aperture with a lobular cross section having an odd number of lobes;
forming a hollow tubular shaft having a body portion, and a joining portion sized to snugly fit within the aperture of the first member, the joining portion having an inner diameter smaller than that of the body portion;

inserting the shaft joining portion into the aperture;

restraining the shaft against elongation by application of longitudinal clamping force to both ends of the shaft; and expanding the joining portion into tight conformity with the aperture by forcing through the joining portion at least one hardened ball having a diameter larger than the joining portion inner diameter and smaller than the body portion inner diameter.

13. The invention as defined in claim 12 wherein the step of expanding comprises forcing a plurality of balls through the joining portion one at a time, each successive ball being larger in diameter than the previous ball to expand the joining portion in stages.

14. The invention as defined in claim 12 including the step of forming a circumferential groove in the aperture such that the joining portion expanded into the aperture and into the groove will be held against axial movement in the aperture.

15. The invention as defined in claim 12 including the step of forming a spline in the aperture such that the joining portion expanded into the aperture in conformation to the splines will be held against rotation in the aperture.

16. The method of assembling a crankshaft from separate crank pins, counterweights and hollow tubular main journals, each counterweight having a center aperture on the axis of rotation for receiving a main journal and an off-axis aperture for receiving a crank pin; including the steps of:

assembling the crank pins with the off-axis apertures of the counterweights;

forming in each counterweight a center aperture with a lobular cross section having an odd number of lobes;

forming on each main journal a main journal body portion, and end portions sized to snugly fit within the center apertures of the counterweights, the main journal end portions having an inner diameter smaller than that of the main journal body portion;

inserting the main journal end portions into the center apertures;

restraining the main journals against elongation by application of longitudinal clamping force to both ends of each such main journal; and expanding the main journal end portions into tight conformity with the center apertures by forcing through the main journal end portions at least one hardened ball having a diameter larger than the main journal end portion inner diameter and smaller than the main journal body portion inner diameter, whereby the main journal end portions are selectively expanded.

17. The invention as defined in claim 16 wherein the crankshaft includes connecting rods attached to the crank pins and including the steps of:

first assembling subassemblies of connecting rods, crank pins and counterweights;

then orienting a plurality of subassemblies with crank pins at the correct angles; and then assembling the main journals to the counterweights.

18. The invention as defined in claim 17 wherein the orienting step comprises:

positioning each subassembly with the center apertures on a predetermined axis; and positioning the free end of each connecting rod at a predetermined location corresponding to the correct angle for each subassembly, whereby the angle of the crank pin is established.

* * * * *